United States Patent
Haack et al.

(10) Patent No.: US 11,415,350 B2
(45) Date of Patent: Aug. 16, 2022

(54) TEMPERATURE CHAMBER AND METHOD

(71) Applicant: WEISS UMWELTTECHNIK GMBH, Reiskirchen (DE)

(72) Inventors: Christian Haack, Marburg (DE); Dennis Reuschel, Giessen (DE); Bjoern Stroh, Gemuenden (DE); Yannik Zahrt, Rabenau (DE); David Blaufelder, Giessen (DE)

(73) Assignee: WEISS TECHNIK GMBH, Reiskirchen (DE)

( * ) Notice: Subject to any disclaimer, the term of this patent is extended or adjusted under 35 U.S.C. 154(b) by 114 days.

(21) Appl. No.: 16/793,583

(22) Filed: Feb. 18, 2020

(65) Prior Publication Data
US 2020/0263911 A1 Aug. 20, 2020

(30) Foreign Application Priority Data
Feb. 20, 2019 (EP) ..................................... 19158190

(51) Int. Cl.
*F25B 49/02* (2006.01)
*F25B 1/00* (2006.01)
(Continued)

(52) U.S. Cl.
CPC .............. *F25B 49/02* (2013.01); *F25B 1/005* (2013.01); *F25B 41/30* (2021.01); *F25D 11/00* (2013.01); *F25D 23/00* (2013.01)

(58) Field of Classification Search
CPC ...... F25B 2341/0011; F25B 2341/0013; F25B 2400/0407; F25B 9/08
See application file for complete search history.

(56) References Cited

U.S. PATENT DOCUMENTS

| | | | |
|---|---|---|---|
| 5,740,681 A * | 4/1998 | Karl .................... | B60H 1/00007 237/2 B |
| 2006/0179877 A1* | 8/2006 | Wessner .................. | F25B 41/31 62/527 |

(Continued)

FOREIGN PATENT DOCUMENTS

| DE | 10 2006 014 867 A1 | 10/2006 |
|---|---|---|
| EP | 0 344 397 A2 | 12/1989 |

(Continued)

OTHER PUBLICATIONS

C. Li, et al. Experimental study on a multi-evaporator refrigeration system with variable area ratio ejector, Applied Thermal Engineering, vol. 102 (2016), pp. 196-203.

*Primary Examiner* — Henry T Crenshaw
(74) *Attorney, Agent, or Firm* — Quarles & Brady LLP (57) ABSTRACT

A temperature chamber for conditioning air includes a temperature-insulated space which receives test material, and a temperature control device for controlling the temperature of the test space. The temperature control device allows a temperature in a range of −50° C. to +180° C. to be established within the space, and has a cooling device including a cooling circuit with a refrigerant, a heat exchanger, a compressor, a condenser, and an expansion element. A jet device is connected to a low-pressure side of the cooling circuit downstream of the heat exchanger and upstream of the compressor, a first bypass is connected to a high-pressure side of the cooling circuit downstream of the compressor, and the refrigerant is suppliable to the jet device from the high-pressure side via the first bypass as a driving fluid.

17 Claims, 4 Drawing Sheets

(51) Int. Cl.
*F25D 11/00* (2006.01)
*F25D 23/00* (2006.01)
*F25B 41/30* (2021.01)

(56) References Cited

U.S. PATENT DOCUMENTS

| | | | |
|---|---|---|---|
| 2012/0023979 A1* | 2/2012 | Taylor | G01N 17/002 |
| | | | 62/115 |
| 2012/0180510 A1* | 7/2012 | Okazaki | F25B 13/00 |
| | | | 62/218 |
| 2015/0330671 A1* | 11/2015 | Suzuki | F04F 5/04 |
| | | | 62/500 |
| 2018/0245822 A1* | 8/2018 | Punuru | B60H 1/323 |

FOREIGN PATENT DOCUMENTS

| | | | |
|---|---|---|---|
| EP | 0344397 | * | 12/1989 |
| EP | 0 780 254 A1 | | 6/1997 |
| EP | 3 315 940 A1 | | 6/2018 |

* cited by examiner

TEMPERATURE CHAMBER AND METHOD

CROSS-REFERENCE TO RELATED APPLICATIONS

This application claims priority to European Patent Application No. 19158190.9 filed Feb. 20, 2019. The contents of this application are hereby incorporated by reference as if set forth in its entirety herein.

The disclosure relates to a temperature chamber and to a method for conditioning air, in particular a test chamber or the like, comprising a temperature-insulated space which can be closed off from the surroundings and which serves to receive test material, and a temperature control device for controlling the temperature of the space, the temperature control device allowing a temperature in a temperature range of −50° C. to +180° C. to be established within the space, the temperature control device having a cooling device comprising a cooling circuit with a refrigerant, a heat exchanger, a compressor, a condenser, and an expansion element.

Temperature chambers or test chambers and methods of this kind are typically used to test physical and/or chemical properties of objects and of temperature chambers, in particular. For instance, temperature test cabinets or climate test cabinets within which temperatures in a range of −50° C. to +180° C. can be set are known. In climate test cabinets, desired climatic conditions can additionally be set, to which the temperature chamber or the test material is then exposed for a defined period of time. Test chambers of this kind are typically or partially configured as mobile devices, which are connected to a building merely via the required supply lines and comprise all modules required for temperature control and air conditioning. Temperature control of a space or test space holding the test material to be tested typically takes place in a circulating air duct within the space. The circulating air duct forms an air treatment space within the space, in which heat exchangers for heating or cooling the air flowing through the circulating air duct and through the space are disposed. A fan or ventilator aspirates the air located in the space and leads it to the respective heat exchangers in the circulating air duct or vice-versa. In this way, the test material can be temperature-controlled or can be exposed to a defined temperature change. During a test interval, a temperature may repeatedly change between a maximum temperature and a minimum temperature of the test chamber, for example. A test chamber of this kind is known from EP 0 344 397 A2 or EP 3 315 940 A1, for example.

Given the high demands placed on a temperature control within the temperature range of the space, a load requirement regularly varies during operation of the test chamber. Hence, a cooling capacity generated by the compressor and the expansion element has to be controllable continuously. Likewise, it is desirable for the compressor to not be switched on and off all too often in order to prolong the service life of the compressor. This requirement is often solved by a bypass, which comprises a controllable expansion element and via which cooling capacity can be recycled past the heat exchanger, being established between a high-pressure side and a low-pressure side of the cooling circuit. With this as-needed distribution of a mass flow generated in the cooling circuit by the compressor, even small temperature differences between a current temperature and a target temperature can be equalized at the heat exchanger without the occurrence of unfavorable loads at the compressor. There is the disadvantage, however, that a capacity of the compressor still is not utilized optimally.

A pressure ratio between a high-pressure side and a low-pressure side of the cooling circuit, i.e., a ratio of the respective pressures upstream and downstream of the compressor, is essential for the capacity of the compressor. Since an evaporation temperature of the refrigerant at the expansion element or at the heat exchanger in cooling devices depends on a suction pressure of the compressor, the suction pressure of the low-pressure side cannot be raised indefinitely because particularly low temperatures can no longer be achieved in that case. If the suction pressure is low and the pressure difference between the high-pressure side and the low-pressure side is accordingly great, however, the efficiency and capacity of the compressor is reduced. An optimal operating point of the compressor is typically present if the pressure ratio—and thus the pressure difference between the high-pressure side and the low-pressure side—is small. Hence, a larger compressor may have to be selected in order to achieve lower temperatures. However, a larger compressor or a compressor not operated optimally requires more energy to be used to operate the cooling device.

Therefore, the object of the present disclosure is to provide a temperature chamber and a method for conditioning air in a space of a temperature chamber by means of which the temperature chamber can be operated in an energy-saving manner.

The temperature chamber for conditioning air according to the disclosure, in particular a test chamber or the like, comprises a temperature-insulated space or test space which can be closed off from the surroundings and which serves to receive test material, and a temperature control device for controlling the temperature of the space, the temperature control device allowing a temperature in a temperature range of −50° C. to +180° C. to be established within the space, the temperature control device having a cooling device comprising a cooling circuit with a refrigerant, a heat exchanger, a compressor, a condenser, and an expansion element, wherein a jet device is connected to a low-pressure side of the cooling circuit downstream of the heat exchanger and upstream of the compressor, a first bypass being connected to a high-pressure side of the cooling circuit downstream of the compressor, the refrigerant being suppliable to the jet device from the high-pressure side via the first bypass as a driving fluid.

The jet device is also commonly referred to as a jet pump or a driving fluid pump, although it does not comprise any moving parts, which is why it does not necessarily have to be considered a machine. Accordingly, the jet device is disposed in a conduit section of the cooling circuit upstream of the compressor, the driving fluid being supplied to the jet device via the first bypass in order to operate the jet device. The first bypass is connected to the jet device so that refrigerant or driving fluid can be routed from the high-pressure side into the jet device on the low-pressure side. Using the jet device, it is possible in this way to increase the pressure in the conduit section of the cooling circuit between the jet device and the compressor. By increasing the suction pressure directly upstream of the compressor by means of the jet device, the compressor can be operated more efficiently at an optimal operating point, which allows improved utilization of a capacity of the compressor and a smaller compressor to be used, where applicable. At the same time, the evaporation pressure or the suction pressure upstream of the jet device and downstream of the heat exchanger can be reduced far enough for comparatively low temperatures to be achieved using the cooling device. Overall, the cooling device can be operated at lower energy expenditure in that case. The cooling device may be provided with the expansion element and the first bypass only, which means that another expansion element or another bypass does not necessarily have to be present.

The jet device may have a drive nozzle, which is connected to the first bypass, and a mixing chamber, wherein the driving fluid can be introduced into the mixing chamber in the flow direction of the cooling circuit via the drive nozzle, wherein the mixing chamber may form a conduit section of the cooling circuit of the low-pressure side. The refrigerant or driving fluid ejected from the nozzle may sweep refrigerant out of the conduit section and convey it in the direction of the compressor. Advantageously, the mixing chamber widens in the direction of the compressor and/or additionally has a diffusor. In that case, the pressure can be increased further in the conduit section upstream of the compressor. At the same time, refrigerant from the conduit section upstream of the jet device of the cooling circuit can be aspirated by the jet device in that case. This may cause a further reduction in pressure in the conduit section upstream of the jet device, which allows lower temperatures to be achieved using the cooling device. Since the refrigerant or driving fluid from the high-pressure side may be compressed and hot refrigerant, an increase in temperature may also be achieved in the conduit section upstream of the compressor. Furthermore, the driving fluid from the high-pressure side may also be refrigerant that has already liquefied.

The first bypass may be provided with at least one first controllable control element. In that case, the jet device may be configured to be controlled via the first control element, wherein the jet device may also be realized with a fixed setting, in principle. Using the first control element, the evaporation pressure achievable in the heat exchanger—and thus the temperature achievable using the cooling device—can be influenced. Moreover, the connection of the high-pressure side and the low-pressure side via the first control element or the first bypass ensures that the compressed, liquid and/or gaseous refrigerant will gradually flow from the high-pressure side to the low-pressure side of the cooling circuit when the installation is standing still. This ensures that a gradual pressure equalization takes place between the high-pressure side and the low-pressure side even if the expansion element is closed.

The first bypass may be connected to the high-pressure side of the cooling circuit upstream of the condenser. In that case, compressed, hot and gaseous refrigerant from the high-pressure side can be supplied to the jet device as a driving fluid.

Alternatively, the first bypass may be connected to the high-pressure side of the cooling circuit downstream of the condenser. In that case, compressed, cold and liquid refrigerant from the high-pressure side can be supplied to the jet device as a driving fluid.

A second bypass having at least one second control element may be formed in the cooling circuit, wherein the second bypass may be connected to the cooling circuit upstream of the expansion element and downstream of the condenser and may bypass the expansion element, wherein the refrigerant may be meterable via the second control element in such a manner that a suction-gas temperature and/or a suction-gas pressure of the refrigerant can be controlled upstream of the compressor on the low-pressure side of the cooling circuit. In this way, the compressor, which may be a compressor device, can be prevented from potentially overheating and then becoming damaged, for example. Consequently, gaseous refrigerant located upstream of the compressor can be cooled via the second bypass by actuating the second control element and adding a metered amount of refrigerant that is still liquid. The second control element can be actuated by means of a controller which is coupled to a pressure and/or temperature sensor in the cooling circuit upstream of the compressor. It is particularly advantageous if an overheating of the suction gas of 2 K to 60 K with respect to a suction gas temperature can be set via the second bypass. Also, the refrigerant can be metered such that an operating time of the compressor can be controlled. It is generally disadvantageous if the compressor is turned on and off repeatedly. A service life of a compressor can be prolonged if the compressor is in operation over longer periods of time. The refrigerant can be led past the expansion element via the second bypass in order to delay an automatic shut-down of the compressor, for example, and to prolong an operating time of the compressor. Optionally, the second bypass with the second control element may be used to control a pressure difference between the high-pressure side and the low-pressure side of the cooling circuit. In this way, a pressure difference can be equalized, for example.

The second bypass may be connected to the cooling circuit downstream of the heat exchanger and upstream of the jet device. In that case, refrigerant from the high-pressure side can be introduced into the low-pressure side upstream of the jet device.

Alternatively, the second bypass may be connected to the first bypass. In that case, refrigerant can be introduced into the jet device from the high-pressure side via the second bypass and the first bypass and can be used as a driving fluid. Since the refrigerant from the second bypass is liquefied and the refrigerant from the first bypass, which has been taken from the high-pressure side upstream of the condenser, is gaseous, a suitable mixture of liquid and gaseous refrigerant for driving the jet device may be realized. Furthermore, the mass flow of the refrigerant from the second bypass can be used to increase a driving mass flow of the refrigerant or driving fluid in the first bypass, allowing a pressure in a conduit section upstream of the compressor to be increased even further. Advantageously, the second bypass may be connected to the first bypass between the first control element and the jet device. Another bypass having at least one other control element may be realized in the cooling circuit, in which case the other bypass may be connected to the cooling circuit upstream of the jet device and downstream of the heat exchanger and upstream of the compressor and downstream of the jet device, thus bypassing the jet device. In certain operating states of the cooling device, a first control element of the first bypass and, if present, a second control element of a second bypass may be closed, which means that the jet device cannot be supplied with driving fluid. In that case, the jet device cannot be used to increase a pressure in the conduit section upstream of the compressor. In contrast, the jet device may cause an undesirable pressure drop upstream of the compressor because it is disposed in the cooling circuit. In that case, it is possible to bypass the jet device, which cannot be shut off on principle, by way of the other bypass and thus to widen a conduit cross-section of the cooling circuit upstream of the compressor. An undesirable loss of pressure upstream of the compressor can be avoided in this way. Optionally, the other control element may be provided with a check valve which prevents refrigerant from flowing against the flow direction of the cooling circuit.

The cooling circuit may have an internal heat exchanger, in which case the internal heat exchanger may be connected to the high-pressure side of the cooling circuit upstream of the expansion element and downstream of the condenser and to the low-pressure side of the cooling circuit upstream of the compressor and downstream of the heat exchanger, allowing the refrigerant of the high-pressure side to be cooled by the refrigerant of the low-pressure side by means of the internal heat exchanger. In this way, the evaporation temperature of the refrigerant cooled by means of the internal heat exchanger may be lowered at the expansion element relative to an evaporation temperature of an uncooled refrigerant. Thus, the cold capacity transferred from the low-pressure side to the high-pressure side via the internal heat exchanger is used, at least partially, preferably exclusively, to lower the evaporation temperature of the refrigerant at the expansion element. Furthermore, this also makes it possible for a zeotropic refrigerant to be used, which has a temperature glide, in which case the location of the dew point temperature of the refrigerant or the dew point of the refrigerant can be shifted into the internal heat exchanger. As a result of the temperature glide of the zeotropic refrigerant, the achieved dew point temperature of the refrigerant may be comparatively high, thus preventing further cooling of the heat exchanger. Accordingly, only part of the refrigerant can evaporate in the heat exchanger, and the non-usable part of the wet steam portion of the refrigerant can be shifted into the internal heat exchanger. Overall, this allows refrigerants having a mass fraction of $CO_2$, which, while being environmentally friendly, have zeotropic properties, to also be used to establish low temperatures in a space. Moreover, the fact that part of the temperature glide or part of the wet steam of the refrigerant can be shifted from the heat exchanger in the space into the internal heat exchanger makes it possible for comparatively improved temperature stability to be achieved using the zeotropic refrigerant. A cold capacity output via the heat exchanger is generated only within a section of the temperature glide, which means that a shift of the dew point of the refrigerant in the cooling circuit will hardly impact a temperature stability of the heat exchanger.

During the lowering of the evaporation temperature of the refrigerant of the high-pressure side, a suction pressure of the refrigerant of the low-pressure side can be kept constant. Greater installation-related complexity, such as additional control of the suction pressure and control of the expansion element as a function of the suction pressure, is no longer necessarily required in that case. In particular, the compressor can also be operated at constant output irrespective of an operating state of the cooling circuit in that case. Especially if piston pumps are used as the compressor, it is essential that they are used at constant speed for long periods of time in order to achieve a long service life.

The refrigerant may evaporate at constant suction pressure on an evaporation section of the cooling circuit from the expansion element to, and including, the internal heat exchanger. At constant suction pressure or evaporation pressure of the refrigerant, the refrigerant can evaporate from the expansion element at a low evaporation temperature toward the internal heat exchanger at a high evaporation temperature according to the temperature glide of the refrigerant. The dew point temperature resulting from the temperature glide may be higher than the temperature of the fluid to be cooled or of the air in the space or test space. Once an evaporation temperature of the refrigerant is equal to the temperature of the air to be cooled in the space at the same suction pressure, no further cooling of the air can be achieved. However, the dew point temperature reached in the heat exchanger is lower than the liquid temperature of the refrigerant on the high-pressure side of the internal heat exchanger, which means that a liquid temperature of the refrigerant can be lowered further. Accordingly, an evaporation temperature downstream of the expansion element can be lowered without a change in suction pressure, whereby a more extensive cooling of the air in the space can be achieved.

The internal heat exchanger may be connected to the low-pressure side upstream of the compressor and downstream of the jet device. In this embodiment, the refrigerant located in the conduit section upstream of the compressor can be used advantageously to undercool the refrigerant on the high-pressure side.

Alternatively, the internal heat exchanger may be connected to the low-pressure side upstream of the jet device and downstream of the heat exchanger. This ensures that substantially gaseous refrigerant can be supplied to the jet device. At the same time, the refrigerant can be used to undercool the refrigerant on the high-pressure side.

The internal heat exchanger may be realized as an undercooling section or a heat exchanger, in particular a plate heat exchanger. The undercooling section may simply be realized by two conduit sections of the cooling circuit that are in contact with each other.

By means of the temperature control device, a temperature in a temperature range of −70° C. to +180° C., preferably −85° C. to +200° C., can be established within the space. Also, a temperature of >+60° C. to +180° C. can be reduced to a temperature of <−50° C. within the space by means of the temperature control device. In that case, the refrigerant in the heat exchanger is heated strongly by the relatively high temperature in the space, which is why, at least on the low-pressure side of the cooling circuit, the cooling circuit can be technically adjusted in terms of its construction to a refrigerant heated in this temperature range. Otherwise, a refrigerant heated in this manner can no longer be optimally used on the high-pressure side of the cooling circuit.

In an embodiment of the test chamber, the heat exchanger can be disposed in the space. Also, the heat exchanger can be disposed in an air treatment space of the space, allowing air circulated by a ventilator to come into contact with a heat exchanger. As a result, an amount of circulated air of the space can be cooled directly in the space by means of the cooling device via the heat exchanger. The test chamber may have the cooling circuit as a sole, single cooling circuit. In that case, the cooling circuit is connected directly to the space.

Alternatively, the heat exchanger can form a cascade heat exchanger for another cooling circuit of the cooling device. Accordingly, the test chamber can have at least two cooling circuits, in which case the cooling circuit may form a first stage of the cooling device.

In another embodiment of the test chamber, the condenser may be realized as a cascade heat exchanger of another cooling circuit of the cooling device. Accordingly, the test chamber may have at least two cooling circuits in that case, wherein one cooling circuit may form a second stage of the cooling device and another cooling circuit, which is connected upstream of the cooling circuit in that case, may form a first stage of the cooling device. In this embodiment of a test chamber, it becomes possible to establish particularly low temperatures in the space.

The temperature control device can have a heating device comprising a heater and a heating heat exchanger in the space. For example, the heating device can be an electrical resistance heater heating the heating heat exchanger in such a manner that the temperature in the space can be increased via the heating heat exchanger. If the heat exchanger and the heating heat exchanger can be specifically controlled to cool or heat the air circulated in the space by means of a control unit, a temperature in the temperature range indicated above can be established within the space by means of the temperature control device. Irrespective of the test material or of an operating state of the test material, a temperature constancy over time of ±1 K, preferably ±0.3 K to ±0.5 K or less than ±0.3 K, can be established in the space during a test interval. The term test interval refers to a time segment of a full test period in which the test material is exposed to a substantially constant temperature or climatic condition. The heating heat exchanger can be combined with the heat exchanger of the cooling circuit in such a manner that a shared heat exchanger body through which the refrigerant can flow and which has heating elements of an electrical resistance heater is formed.

The condenser can be cooled by air or water or by another cooling fluid. In principle, the condenser can be cooled with any suitable fluid. The substantial point is that the thermal load occurring at the condenser is dissipated via cooling air or cooling water in such a manner that the refrigerant can condense until it is completely liquefied.

The expansion element and/or the control element may have a throttle element and a magnetic valve, in which case refrigerant can be metered via the throttle element and the magnetic valve. The throttle element may be an adjustable valve or a capillary via which refrigerant is routed by means of the magnetic valve. The magnetic valve itself may be actuated by means of a control unit of the temperature device. In principle, the expansion element and/or the control element may also serve as a shutoff element for completely closing a conduit.

The temperature control device may also comprise a control unit having at least a pressure sensor and/or at least a temperature sensor in the cooling circuit, wherein a magnetic valve may be actuated by means of the control unit as a function of a measured temperature or pressure. The control unit may comprise means for data processing which may process data sets from sensors and control the magnetic valves. In this case, a function of the cooling device may also be adjusted to the refrigerant used via a corresponding computer program, for example. Furthermore, the control unit can signal a malfunction and, if necessary, initiate a shut-down of the test chamber in order to protect the test chamber and the test material from being damaged by critical or undesirable states of operation of the test chamber.

In the method according to the disclosure for conditioning air in a temperature-insulated space of a temperature chamber, in particular a test chamber or the like, which can be closed off from the surroundings and which serves to receive test material, a cooling device of a temperature control device of the temperature chamber comprising a cooling circuit with a refrigerant, a heat exchanger, a compressor, a condenser and an expansion element is used to establish a temperature in a temperature range of −50° C. to +180° C. within the space, wherein a jet device is connected to a low pressure side of the cooling circuit downstream of the heat exchanger and upstream of the compressor, the refrigerant from a high-pressure side being supplied to the jet device as a driving fluid via a first bypass connected to the high-pressure side of the cooling circuit downstream of the compressor. Regarding the advantages of the method according to the disclosure, reference is made to the description of advantages of the temperature chamber according to the disclosure.

The driving fluid may be introduced into a mixing chamber of the jet device in the flow direction of the cooling circuit via a drive nozzle of the jet device, the drive nozzle being connected to the first bypass, wherein the refrigerant may be aspirated into the mixing chamber as a suction fluid upstream of the jet device and may be discharged from the mixing chamber downstream of the jet device at a higher pressure than that of the suction fluid.

Hereinafter, preferred embodiments of the disclosure will be explained in more detail with reference to the accompanying drawings.

Figure 1:
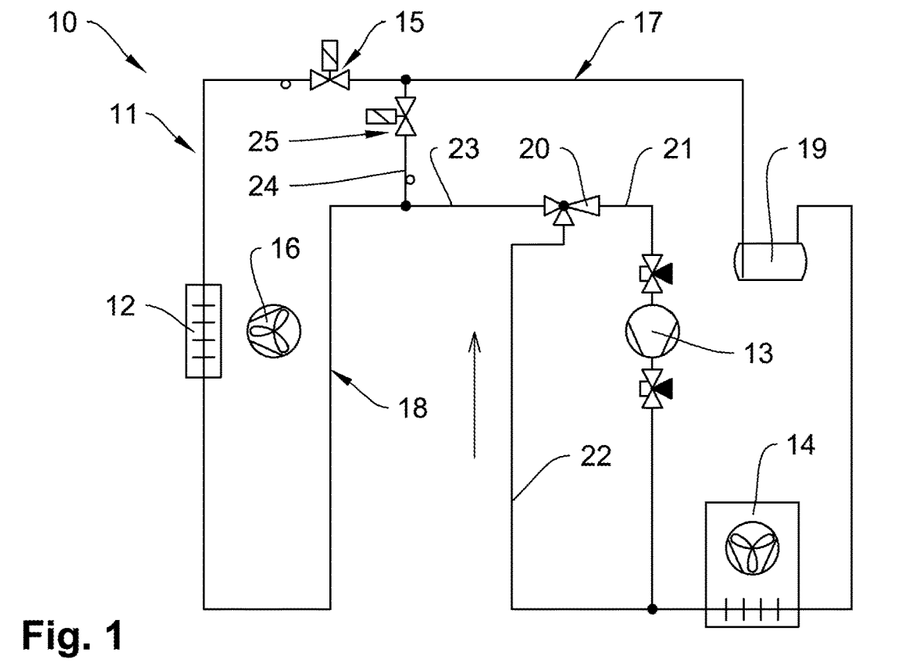
FIG. 1 is a schematic illustration of a first embodiment of a cooling device.

FIG. 1 shows a first embodiment of a cooling device 10 of a temperature chamber or test chamber (not shown). Cooling device 10 comprises a cooling circuit 11 with a refrigerant, a heat exchanger 12, a compressor 13, a condenser 14 and an expansion element 15. Heat exchanger 12 is disposed in a space or test space (not shown) of the test chamber. In the space, a fan 16 for circulating air is provided at heat exchanger 12. Furthermore, cooling circuit 11 has a high-pressure side 17, a low-pressure side 18 and a compensation tank 19.

The refrigerant is aspirated upstream of compressor 13 and compressed, thus increasing a pressure on high-pressure side 17 compared to low-pressure side 18. Downstream of compressor 13, the refrigerant is liquefied using condenser 14. The refrigerant is decompressed at expansion element 15 and at least partially or fully evaporated in heat exchanger 12. Thereafter, the wet steam of the refrigerant returns to compressor 13. Downstream of heat exchanger 12 and upstream of compressor 13 in the flow direction of the refrigerant, a jet device 20 is connected to a conduit section 21 upstream of compressor 13. Furthermore, a to first bypass 22, via which refrigerant from high-pressure side 17 is supplied to jet device 20 as a driving fluid, is connected downstream of compressor 13 and upstream of condenser 14. First bypass 22 is connected to a drive nozzle (not shown) of jet device 20, via which the refrigerant is introduced into a mixing chamber (not shown) of jet device 20 as a driving fluid in such a manner that refrigerant from a conduit section 23 is aspirated into cooling circuit 11 upstream of jet device 20 and accelerated. This causes an increase in pressure in conduit section 21 compared to the pressure in conduit section 23. Advantageously, this allows compressor 13, which may be a compressor device, to be operated in an energetically favorable output range.

A second bypass 24 having at least one second control element 25 is integrated in cooling circuit 11, second bypass 24 being connected to cooling circuit 11 upstream of expansion element 15 and downstream of condenser 14 in the flow direction of the refrigerant. Furthermore, second bypass 24 is connected to cooling circuit 11 downstream of heat exchanger 12 and upstream of jet device 20 in the flow direction of the refrigerant, second bypass 24 thus bypassing expansion element 15. Via second control element 25, refrigerant can now be metered in such a manner that a suction gas temperature and/or a suction gas pressure of the refrigerant can be controlled on low-pressure side 18 of cooling circuit 11 upstream of compressor 13.

Figure 2:
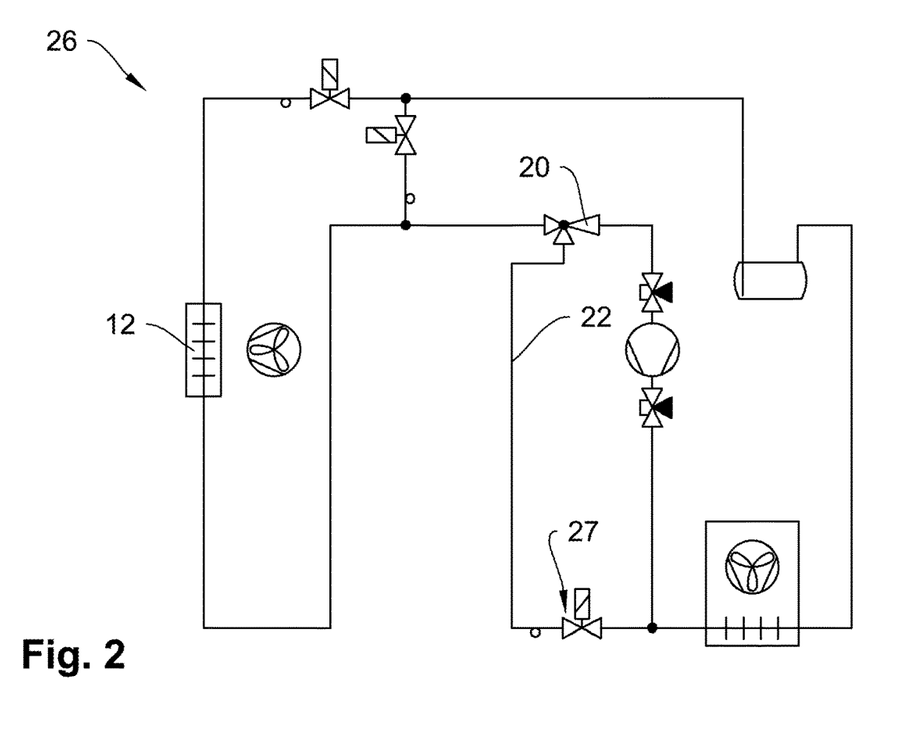
FIG. 2 is a schematic illustration of a second embodiment of a cooling device.

FIG. 2 shows a second embodiment of a cooling device 26, which differs from the cooling device of FIG. 1 in that a first control element 27 is disposed or connected in first bypass 22. Via first control element 27, a drive of jet device 20 can be controlled. This also allows an evaporation pressure achievable in heat exchanger 12 to be influenced, for example.

Figure 3:
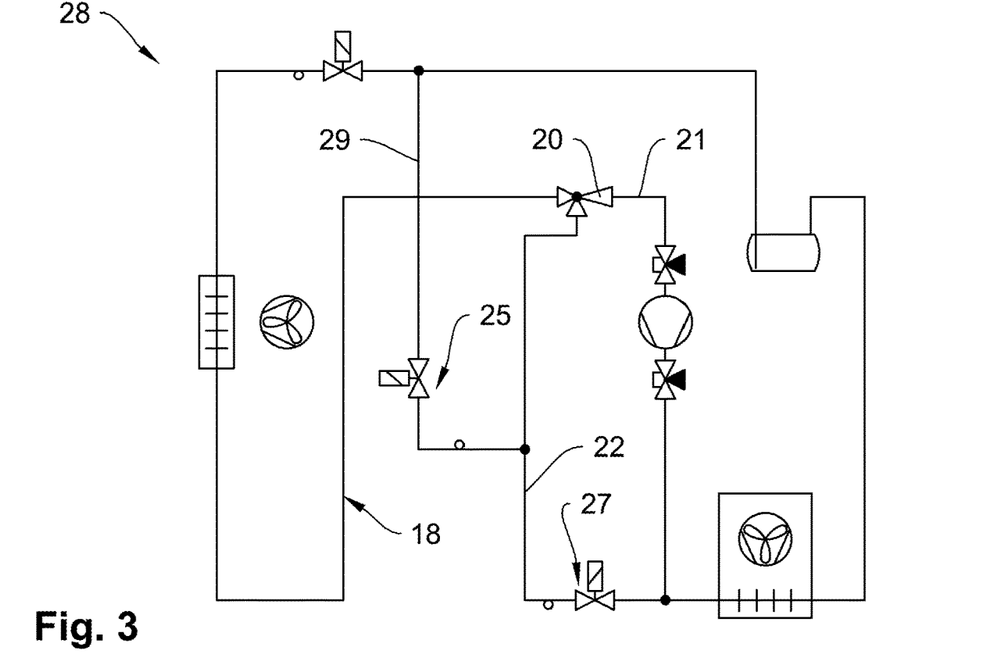
FIG. 3 is a schematic illustration of a third embodiment of a cooling device.

FIG. 3 shows an embodiment of a cooling device 28 which differs from the cooling device shown in FIG. 2 in that a second bypass 29 is not connected directly to low-pressure side 18 but to first bypass 22. Consequently, second bypass 29 is connected to first bypass 22 downstream of first control element 27 and upstream of jet device 20 in the flow direction of the refrigerant. The refrigerant flowing via second control element 25 of second bypass 29 in a controlled manner can also be used as a driving fluid for jet device 20 in that case. This increase of a driving mass flow of jet device 20 enables a further increase in pressure in conduit section 21.

Figure 4:
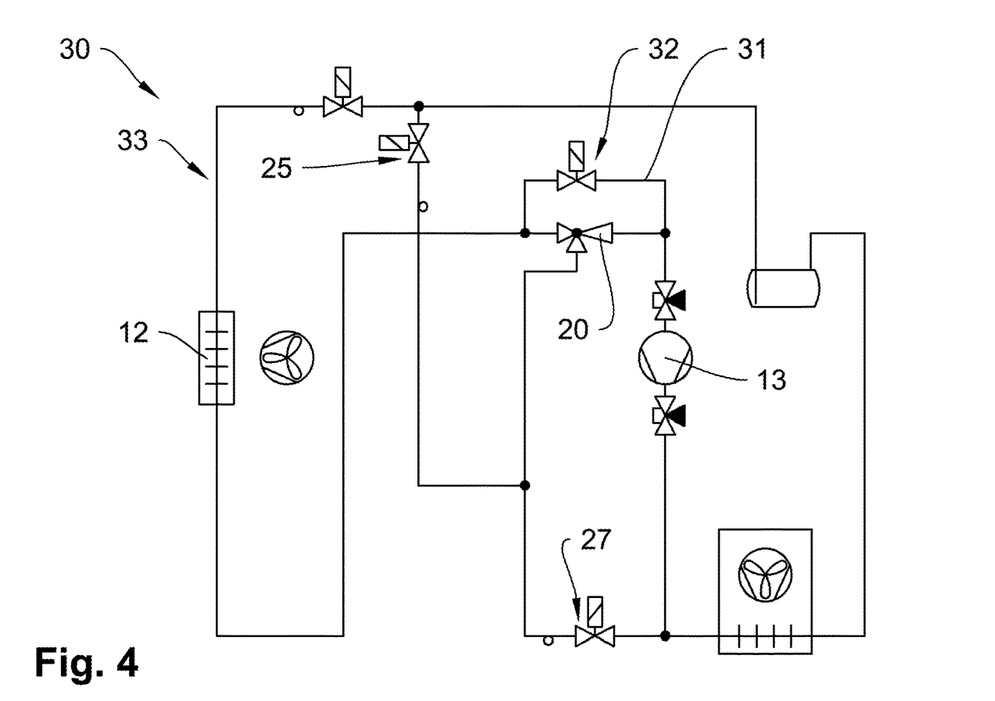
FIG. 4 is a schematic illustration of a fourth embodiment of a cooling device.

FIG. 4 shows an embodiment of a cooling device 30 which differs from the cooling device of FIG. 3 in that another bypass 31 is provided. Other bypass 31 is provided with another control element 32 and connected to thus-formed cooling circuit 33 upstream of jet device 20 and downstream of heat exchanger 12 in the flow direction of the refrigerant. Furthermore, other bypass 31 is connected to cooling circuit 33 upstream of compressor 13 and downstream of jet device 20. If second control element 25 and first control element 27 are closed, no driving mass flow for jet device 20 can be provided, which means that no increase in pressure can be generated upstream of compressor 13 using jet device 20. Jet device 20, which is not driven in that case, causes an undesirable pressure drop upstream of compressor 13. Third bypass 31 can now be used to bypass jet device 20 so as to enlarge a conduit cross-section and to prevent this pressure drop.

Figure 5:
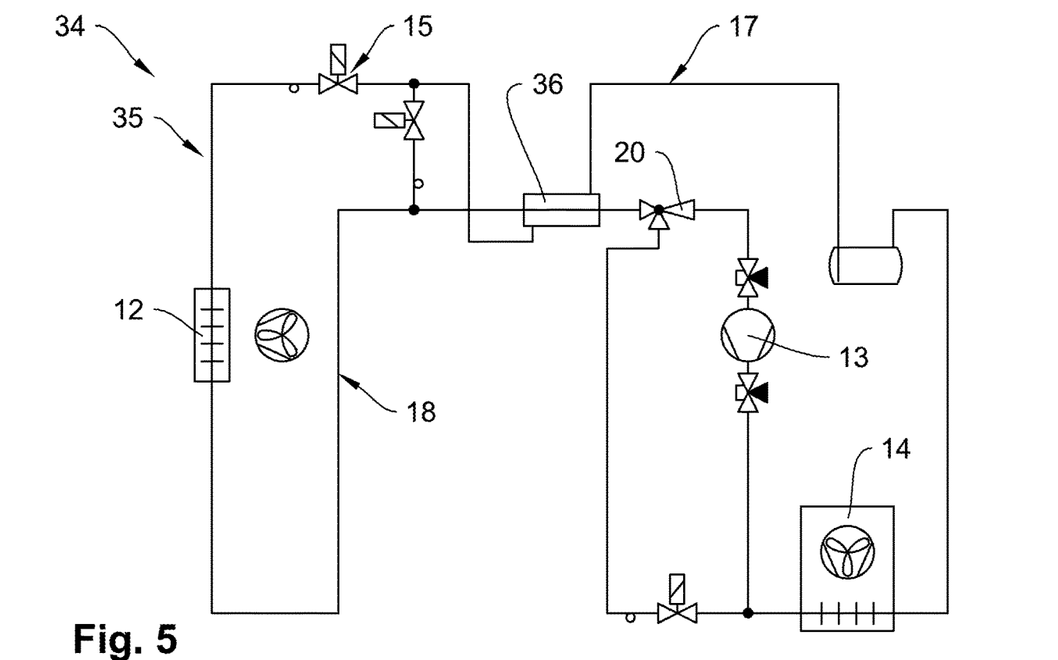
FIG. 5 is a schematic illustration of a fifth embodiment of a cooling device.

FIG. 5 shows another embodiment of a cooling device 34, which differs from the cooling device of FIG. 2 in that an internal heat exchanger 36 is connected in thus-formed cooling circuit 35. In particular, internal heat exchanger 36 is connected to high-pressure side 17 upstream of expansion element 15 and downstream of condenser 14 and to low-pressure side 18 upstream of jet device 20 and downstream of heat exchanger 12 in the flow direction of the refrigerant. On high-pressure side 17, refrigerant flowing toward expansion element 15 can be cooled be means of internal heat exchanger 36. Cooling may take place by the refrigerant on low-pressure side 18 being re-evaporated in internal heat exchanger 36. In this case, in particular, a refrigerant having a particularly wide temperature glide can be used.

Figure 6:
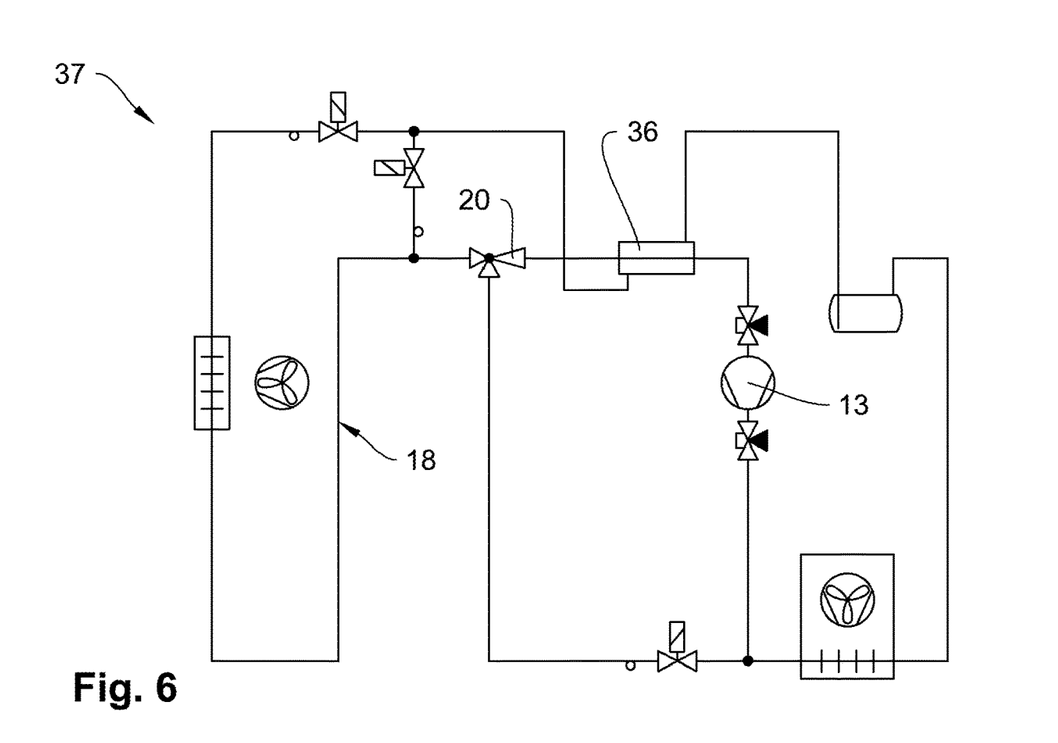
FIG. 6 is a schematic illustration of a sixth embodiment of a cooling device.

FIG. 6 shows an alternative embodiment of a cooling device 37, which differs from the cooling device of FIG. 5 in that internal heat exchanger 36 is connected to low-pressure side 18 between jet device 20 and compressor 13.

Figure 7:
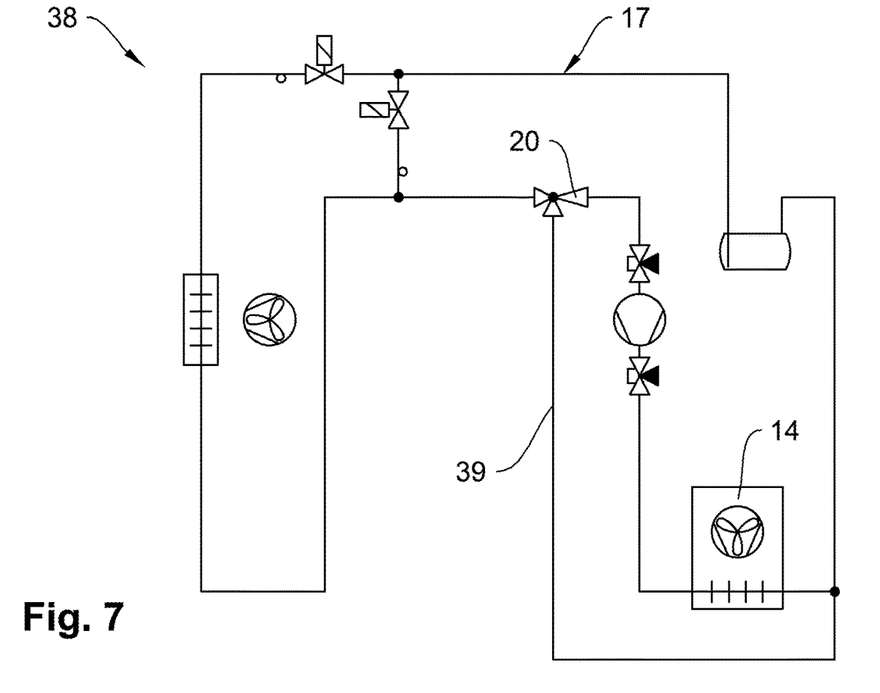
FIG. 7 is a schematic illustration of a seventh embodiment of a cooling device.

FIG. 7 shows an embodiment of a cooling device 38 which differs from the cooling device of FIG. 1 in that a first bypass 39 is connected downstream of condenser 14. Via first bypass 39, cold and liquid refrigerant can be supplied to jet device 20 as a driving fluid from high-pressure side 17.

Figure 8:
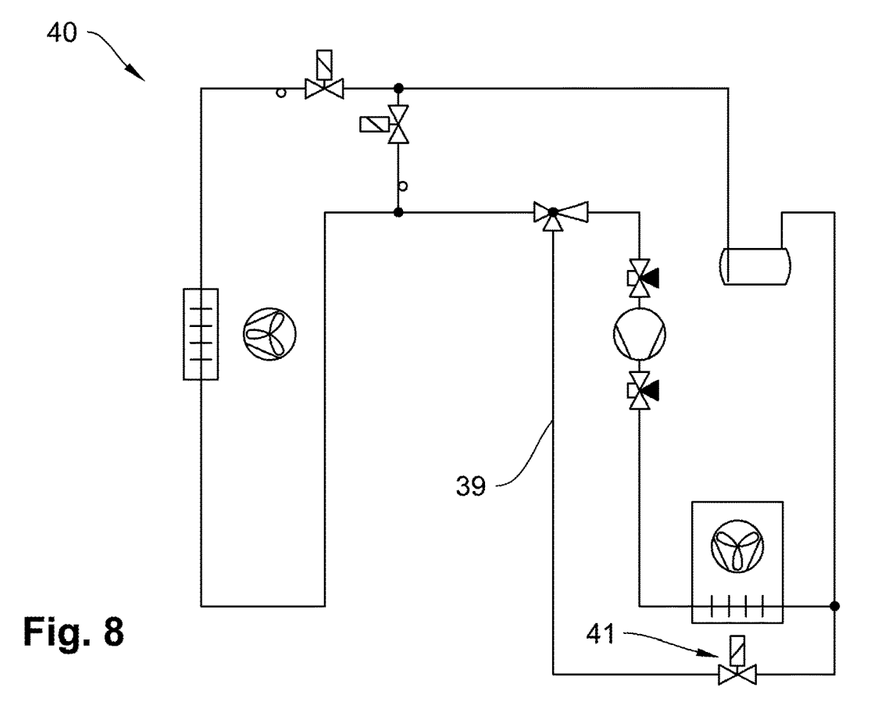
FIG. 8 is a schematic illustration of an eighth embodiment of a cooling device.

FIG. 8 shows an embodiment of a cooling device 40 which differs from the cooling device of FIG. 7 in that a first control element 41 is disposed or connected in first bypass 39.

The invention claimed is:

1. A temperature chamber for conditioning air, in particular a test chamber or the like, comprising a temperature-insulated space which can be closed off from the surroundings and which serves to receive test material and a temperature control device for controlling the temperature of the space, the temperature control device allowing a temperature in a temperature range of −50° C. to +180° C. to be established within the space, the temperature control device having a cooling device comprising a cooling circuit with a refrigerant, a heat exchanger, a compressor, a condenser, and an expansion element, wherein
a jet device is connected to a low-pressure side of the cooling circuit downstream of the heat exchanger and upstream of the compressor, a first bypass being connected to a high-pressure side of the cooling circuit downstream of the compressor, the refrigerant being suppliable to the jet device from the high-pressure side via the first bypass as a driving fluid, wherein the first bypass is connected to the high-pressure side of the cooling circuit upstream of the condenser.

2. The temperature chamber according to claim 1, wherein the jet device has a drive nozzle, which is connected to the first bypass, and a mixing chamber, the driving fluid being introduced into the mixing chamber in the flow direction of the cooling circuit via the drive nozzle, the mixing chamber forming a conduit section of the cooling circuit of the low-pressure side.

3. The temperature chamber according to claim 1, wherein the first bypass is provided with at least one first control element.

4. The temperature chamber according to claim 1, wherein the first bypass is connected to the high-pressure side of the cooling circuit downstream of the condenser.

5. The temperature chamber according to claim 1, wherein another bypass having at least one other control element is formed in the cooling circuit, the other bypass being connected to the cooling circuit upstream of the jet device and downstream of the heat exchanger and upstream of the compressor and downstream of the jet device and bypassing the jet device.

6. The temperature chamber according to claim 1, wherein the cooling circuit has an internal heat exchanger, the internal heat exchanger being connected to the high-pressure side of the cooling circuit upstream of the expansion element and downstream of the condenser and to the low-pressure side of the cooling circuit upstream of the compressor and downstream of the heat exchanger, the refrigerant of the high-pressure side being coolable by the refrigerant of the low-pressure side by means of the internal heat exchanger.

7. The temperature chamber according to claim 6, wherein the internal heat exchanger is connected to the low-pressure side upstream of the compressor and downstream of the jet device.

8. The temperature chamber according to claim 6, wherein the internal heat exchanger is connected to the low-pressure side upstream of the jet device and downstream of the heat exchanger.

9. The temperature chamber according to claim 1, wherein the heat exchanger is disposed in the space.

10. The temperature chamber according to claim 1, wherein the heat exchanger forms a cascade heat exchanger for another cooling circuit of the cooling device.

11. The temperature chamber according to claim 1, wherein the condenser is realized as a cascade heat exchanger of another cooling circuit of the cooling device.

12. The temperature chamber according to claim 1, wherein the expansion element and/or a control element has a throttle element and a magnetic valve, refrigerant being meterable via the throttle element and the magnetic valve.

13. A temperature chamber for conditioning air, in particular a test chamber or the like, comprising a temperature-insulated space which can be closed off from the surroundings and which serves to receive test material and a temperature control device for controlling the temperature of the space, the temperature control device allowing a temperature in a temperature range of −50° C. to +180° C. to be established within the space, the temperature control device having a cooling device comprising a cooling circuit with a refrigerant, a heat exchanger, a compressor, a condenser, and an expansion element, wherein a jet device is connected to a low-pressure side of the cooling circuit downstream of the heat exchanger and upstream of the compressor, a first bypass being connected to a high-pressure side of the cooling circuit downstream of the compressor, the refrigerant being suppliable to the jet device from the high-pressure side via the first bypass as a driving fluid, and wherein a second bypass having at least one second control element is formed in the cooling circuit, the second bypass being connected to the cooling circuit upstream of the expansion element and downstream of the condenser and bypassing the expansion element, refrigerant being meterable via the second control element in such a manner that a suction gas temperature and/or a suction gas pressure of the refrigerant on the low-pressure side of the cooling circuit is controllable upstream of the compressor.

14. The temperature chamber according claim 13, wherein the second bypass is connected to the cooling circuit downstream of the heat exchanger and upstream of the jet device.

15. The temperature chamber according to claim 13, wherein the second bypass is connected to the first bypass.

16. A method for conditioning air in a temperature-insulated space of a temperature chamber, in particular a test chamber or the like, which can be closed off from the surroundings and which serves to receive test material, a temperature in a temperature range of −50° C. to +180° C. being established within the space by means of a cooling device of a temperature control device of the temperature chamber, comprising a cooling circuit with a refrigerant, a heat exchanger, a compressor, a condenser and an expansion element, wherein a jet device is connected to a low-pressure side of the cooling circuit downstream of the heat exchanger and upstream of the compressor, the refrigerant being supplied to the jet device from the high-pressure side as a driving fluid via a first bypass connected to a high-pressure side of the cooling circuit downstream of the compressor, and wherein a second bypass having at least one second control element is formed in the cooling circuit, the second bypass being connected to the cooling circuit upstream of the expansion element and downstream of the condenser and bypassing the expansion element, refrigerant being meterable via the second control element in such a manner that a suction gas temperature and/or a suction gas pressure of the refrigerant on the low-pressure side of the cooling circuit is controllable upstream of the compressor.

17. The method according to claim 16, wherein the driving fluid is introduced into a mixing chamber of the jet device in the flow direction of the cooling circuit via a drive nozzle of the jet device, said drive nozzle being connected to the first bypass, the refrigerant being aspirated into the mixing chamber as a suction fluid upstream of the jet device and being ejected from the mixing chamber downstream of the jet device at a higher pressure than that of the suction fluid.

* * * * *

UNITED STATES PATENT AND TRADEMARK OFFICE
CERTIFICATE OF CORRECTION

PATENT NO. : 11,415,350 B2
APPLICATION NO. : 16/793583
DATED : August 16, 2022
INVENTOR(S) : Christian Haack et al.

It is certified that error appears in the above-identified patent and that said Letters Patent is hereby corrected as shown below:

In the Specification

Column 8, Line 46, "Furthermore, a to first" should be --Furthermore, a first--.

Signed and Sealed this
Fourth Day of October, 2022

Katherine Kelly Vidal
*Director of the United States Patent and Trademark Office*